United States Patent
Di Lago et al.

(10) Patent No.: US 8,417,421 B2
(45) Date of Patent: Apr. 9, 2013

(54) ELECTRONIC SYSTEM TO INDUCE THE OCCUPANTS OF A VEHICLE TO FASTEN SEAT BELTS

(75) Inventors: Vincenzo Di Lago, Turin (IT); Antonio Piccinini, Turin (IT)

(73) Assignee: Fiat Group Automobiles S.p.A. (IT)

( * ) Notice: Subject to any disclaimer, the term of this patent is extended or adjusted under 35 U.S.C. 154(b) by 822 days.

(21) Appl. No.: 12/466,776

(22) Filed: May 15, 2009

(65) Prior Publication Data
US 2009/0312915 A1 Dec. 17, 2009

(30) Foreign Application Priority Data
May 20, 2008 (EP) .................................... 08425354

(51) Int. Cl.
*B60R 22/00* (2006.01)

(52) U.S. Cl.
USPC ...... 701/45; 74/471 XY; 297/468; 340/457.1; 340/686.1; 340/905; 345/8; 455/404.1

(58) Field of Classification Search ............. 74/471 XY; 297/468; 340/457.1, 686.1, 905; 345/8; 455/404.1
See application file for complete search history.

(56) References Cited

U.S. PATENT DOCUMENTS

| | | | | |
|---|---|---|---|---|
| 2002/0140633 | A1* | 10/2002 | Rafii et al. | 345/8 |
| 2002/0148317 | A1* | 10/2002 | Onodera | 74/471 XY |
| 2003/0160689 | A1* | 8/2003 | Yazdgerdi | 340/457.1 |
| 2004/0119599 | A1* | 6/2004 | Stevenson et al. | 340/686.1 |
| 2004/0150517 | A1* | 8/2004 | Okita et al. | 340/457.1 |
| 2004/0209594 | A1* | 10/2004 | Naboulsi | 455/404.1 |
| 2006/0061201 | A1* | 3/2006 | Skinner | 297/468 |
| 2006/0108167 | A1 | 5/2006 | Finger | 180/268 |
| 2008/0024285 | A1 | 1/2008 | Vandenbrink et al. | 340/438 |
| 2008/0174451 | A1* | 7/2008 | Harrington et al. | 340/905 |

FOREIGN PATENT DOCUMENTS

AU 773390 5/2004

OTHER PUBLICATIONS

European Search Report mailed Dec. 15, 2008 in corresponding European Application No. 08425354.1.

\* cited by examiner

*Primary Examiner* — James Trammell
*Assistant Examiner* — Sanjeev Malhotra
(74) *Attorney, Agent, or Firm* — Ostrolenk Faber LLP

(57) ABSTRACT

An electronic system to induce the occupants of a vehicle to fasten seat belts is described. The electronic system is configured to determine an alert condition indicating that a seat belt of at least one occupant of the vehicle is not fastened or is not properly fastened. The electronic system is also configured to allow the car radio to operate even when said alert condition is present, and to control the volume of the car radio for as long as said alert condition persists, preventing it from exceeding a low volume level.

12 Claims, 1 Drawing Sheet

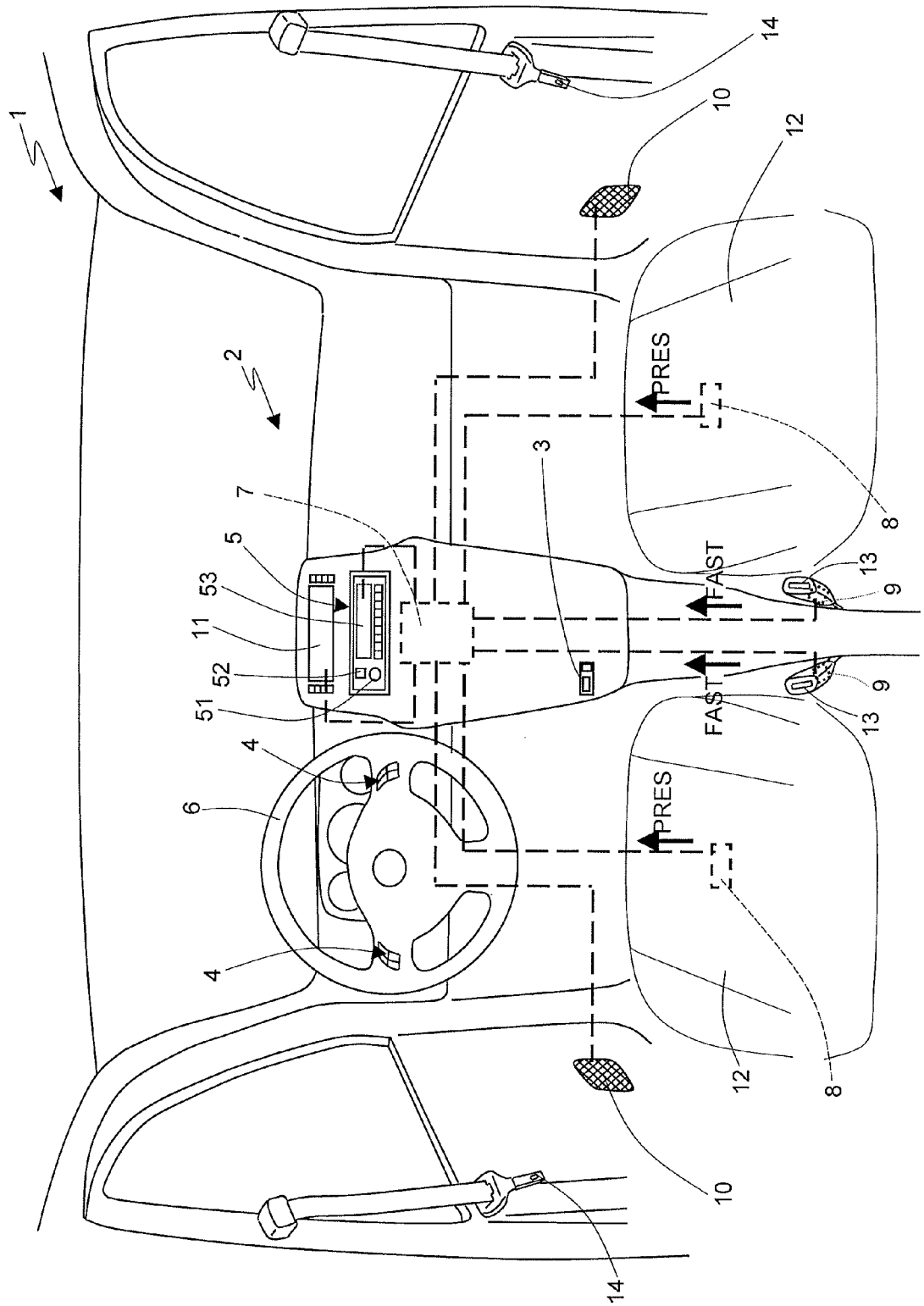

US 8,417,421 B2

ELECTRONIC SYSTEM TO INDUCE THE OCCUPANTS OF A VEHICLE TO FASTEN SEAT BELTS

The present invention relates to an electronic system to induce the occupants of a vehicle to fasten seat belts.

BACKGROUND OF THE INVENTION

As is known, the use of seat belts is compulsory under many highway codes, and the vehicles that circulate in countries where their use is compulsory are fitted with an acoustic signalling device to indicate that the occupants have not fastened their seat belts. Said device generally consists of a buzzer that is activated when the vehicle exceeds a given minimum speed. The acoustic signal is usually accompanied by an optical signal to indicate that the seat belts have not been fastened which consists of a specific warning light on the vehicle's instrument panel.

To induce the occupants of vehicles to fasten seat belts various systems have been proposed which automatically deactivate the vehicle's on-board devices and prevent these from functioning until the seat belts are fastened. For example a system has been proposed that automatically prevents the vehicle's air conditioning system from working, while Japanese patent application JP2004136888 proposes a system that automatically prevents the vehicle radio from working and activates an acoustic signalling device that transmits, at an increasingly high volume, a recorded voice message inviting the occupants to fasten their seat belts.

However the Applicant has noted that the use of such automatic systems to prevent on-board systems from functioning may result in the occupants of the vehicle erroneously perceiving the presence of an on-board system malfunction, which could subsequently damage the image of the vehicle manufacturer.

SUMMARY OF THE INVENTION

Therefore, the purpose of the present invention is to produce an electronic system that on the one hand induces the occupants of a vehicle to fasten seat belts, but on the other does not lead the occupants of the vehicle to erroneously perceive the presence of malfunctions in said vehicle.

According to the present invention an electronic system to induce the occupants of a vehicle to fasten seat belts is provided, as claimed in the attached claims.

BRIEF DESCRIPTION OF THE DRAWING

In order to better understand the present invention, a non-limiting preferred embodiment thereof will now be described by way of example, with reference to the accompanying drawing, wherein:

FIG. 1 schematically shows a passenger compartment of a vehicle equipped with an on-board infotelematic system comprising a system to induce the occupants to fasten seat belts according to the present invention.

DETAILED DESCRIPTION OF THE INVENTION

The following description is provided to enable an expert in the field to implement and use the invention. The expert in the field will be able to implement various modifications to the embodiments described herein and the general principles disclosed herein could be applied to other embodiments and applications without departing from the scope of the present invention.

Therefore the present invention is not to be limited in scope to the specific embodiments described and illustrated herein, but is to be accorded with the widest scope consistent with the principles and features disclosed herein and in the appended claims.

FIG. 1 shows a passenger compartment 1 of a vehicle equipped with an on-board infotelematic system 2 (not visible by the user as it is installed under the dashboard).

An example of on-board infotelematic communication and entertainment system is the Blue&Me™ system developed by the Applicant. Said system offers Bluetooth and USB connectivity and a hands-free mobile phone set which can be controlled completely by voice control.

In particular, the Blue&Me™ system allows the driver and passengers to use personal mobile devices, such as mobile phones, PDAs, music players or external hard disks, and on-board equipments such as the car radio and the satellite navigation system, without having to use the controls of said equipments, in order to make said equipments easier and safer to use while driving. For that purpose, the Blue&Me™ system incorporates a voice recognition system so that most functions can be accessed using voice commands or keys on the vehicle's steering wheel. The personal mobile devices and Blue&Me™ system exchange data via a Bluetooth system or USB port.

In detail, with reference to FIG. 1, the on-board infotelematic system 2 comprises: a car radio 5, at least one interface 3 for connecting personal electronic devices such as mobile phones, PDAs, music players or external hard disks, for example a USB port, a plurality of keys 4 to control the functions of the personal electronic devices, the hands-free phone set, and the car radio 5, arranged for example on the steering wheel 6 of the vehicle, and an electronic control and processing unit (not illustrated), connected to the car radio 5, the USB port 3, to the keys 4 and to the electronic control unit (not illustrated) of the engine of the vehicle.

Moreover, again with reference to FIG. 1, the on-board infotelematic system 2 comprises an electronic system 7 to induce the occupants of a vehicle to fasten seat belts according to the present invention.

The electronic system 7 to induce the occupants of a vehicle to fasten seat belts is installed under the dashboard and connected to first means 8 to receive from said first means 8 a presence signal PRES indicating that a user is seated on a seat of the vehicle. In FIG. 1 only the first means 8 installed in the seat bases 12 of the front seats of the passenger compartment 1 are shown, while it is understood that further first means 8 are also installed in the rear seats (not shown in FIG. 1).

Moreover, again with reference to FIG. 1, the electronic system 7 to induce the occupants of a vehicle to fasten seat belts is connected to second means 9 to receive from said second means 9 a fastening signal FAST indicating that a seat belt has been fastened. In FIG. 1 only the second means 9 integrated in the seat belts associated with the front seats of the passenger compartment 1 are shown, in particular integrated in the buckles 13 of the seat belts. It is understood that further second means 9 are also integrated in the seat belts associated with the rear seats (not shown in FIG. 1)

The electronic system 7 to induce the occupants of a vehicle to fasten seat belts can be connected to both first means 8 and second means 9 of a known type, which are not described in detail, and to first means 8 and second means 9 incorporating future technological solutions which are not yet available.

Broadly speaking, first means 8 of a known type may comprise a pressure sensor installed in the seat base 12 of a seat to measure the pressure exerted on said seat base 12. The first means 8 of this type detect the presence of a user seated on the seat when the pressure measured by the pressure sensor exceeds a given threshold, which prevents it from detecting the presence of a user when a moderately heavy object is placed on the seat base 12.

Broadly speaking, second means 9 of a known type may be implemented by means of an electric circuit integrated in the buckle 13 of a seat belt. Said electric circuit works like an ON/OFF switch: when the seat belt is fastened the electric circuit is closed by the tongue 14 inserted in the buckle 13 and the switch is in the ON state, whereas when the seat belt is not fastened the electric circuit is open and the switch is in the OFF state.

In future the first means 8 and the second means 9 may be implemented using new technological solutions, for example based on optical sensors.

Based on the presence signal PRES and on the fastening signal FAST, the electronic system 7 to induce the occupants of a vehicle to fasten seat belts determines an alert condition indicating that at least one user is seated on a seat of the vehicle and has not fastened, or has incorrectly fastened the corresponding seat belt.

The electronic system 7 allows the car radio 5 to operate even when the alert condition is present and, for as long as said alert condition persists, controls the volume of the car radio 5 so that it cannot exceed a low volume level.

In particular, for as long as the alert condition persists, the electronic system 7 allows a user to turn the car radio 5 on and off either manually, using the keys 4 or the on/off button, indicated with 52 in FIG. 1, provided on the car radio 5, or vocally, i.e. using voice commands supported by the on-board infotelematic system 2.

If the car radio 5 is turned on while the alert condition persists, the electronic system 7 sets the volume of the car radio 5 to the low volume level.

If, when the alert condition occurs, the car radio 5 is on and the volume is higher than the low volume level, the electronic system 7 lowers the volume of the car radio 5 to the low volume level.

Moreover, in a first embodiment of the electronic system 7, for as long as the alert condition persists, the electronic system 7 makes the car radio 5 operate at the low volume level and prevents the user from adjusting the volume of the car radio 5 either manually, using the keys 4 on the steering wheel 6 or the volume control, indicated with 51 in FIG. 1, provided on the car radio 5, or vocally, using voice commands supported by the on-board infotelematic system 2.

In a second embodiment of the electronic system 7, for as long as the alert condition persists, the electronic system 7 limits an increase in the volume of the car radio 5 by the user above the low volume level. Conveniently, the electronic system 7 inhibits any increase in the volume of the car radio 5 above the low volume level, said increase being requested by the user manually, using the keys 4 or the volume control 51, or vocally, i.e. using voice commands supported by the on-board infotelematic system 2.

In said second embodiment, the electronic system 7 allows the user to adjust the volume of the car radio 5 as desired to levels below the low volume level.

Moreover, the electronic system 7 to induce the occupants of a vehicle to fasten seat belts is configured to emit a message inviting said occupants to fasten seat belts for as long as the alert condition persists.

In particular, said message can be emitted by the electronic system 7 continuously, or each time the user tries to adjust the volume of the car radio 5, or each time the user tries to increase the volume of the car radio 5 to above the low volume level.

Moreover, the message with the invitation to fasten the seat belts can be an acoustic and/or optical message. The acoustic message inviting the occupants to fasten seat belts can be emitted through the loudspeakers, indicated with 10 in FIG. 1, of the stereo system with which each vehicle is normally equipped, or via an ad hoc electric-acoustic transducer (not shown in FIG. 1), such as for example a buzzer.

Accordingly, the low volume level is set to render the message inviting the occupants to fasten seat belts audible.

The optical message inviting the occupants to fasten seat belts can be displayed on a screen, indicated with 11 in FIG. 1, arranged on the dashboard or instrument panel, or on the display screen 53 of the car radio 5.

In a further embodiment of the electronic system 7 to induce the occupants of a vehicle to fasten seat belts, the electronic system 7 is also coupled to third means (not illustrated in FIG. 1) to receive from said third means a speed signal SPEED indicating the speed of the vehicle. According to this embodiment, the electronic system 7 determines the alert condition also based on the speed signal SPEED.

In particular, the alert condition is determined when:
a user is seated on a seat and the corresponding seat belt is not fastened or is not properly fastened, and
a the speed of the vehicle is other than zero.

Alternatively, the alert condition is determined when:
a user is seated on a seat and the corresponding seat belt is not fastened or is not properly fastened, and
the speed of the vehicle exceeds a given minimum speed.

The advantages of the present invention are immediately apparent from the above description.

In particular it is important to note that the electronic system to induce the occupants of a vehicle to fasten seat belts according to the present invention allows to combine at the same time the need for the occupants of the vehicle to be able to hear the acoustic signal indicating that the seat belts are not fastened, with the need for the occupants of the vehicle to not erroneously perceive the presence of malfunctions in the vehicle ensuing from the satisfaction of the first need.

Moreover, the electronic system to induce the occupants of a vehicle to fasten seat belts according to the present invention provides the occupants with an additional incentive to fasten their seat belts. If the occupants wish to exploit the functions of the vehicle radio to the full, they are obliged by the system according to the present invention to fasten their seat belts.

Lastly, it is clear that various modifications can be made to the present invention, all of which fall within the scope of the invention as defined in the appended claims.

In particular, it is important to note that the electronic system to induce the occupants of a vehicle to fasten seat belts can advantageously be integrated directly into the electronic control and processing unit of the on-board infotelematic system. In other words, the electronic control and processing unit of the on-board infotelematic system could have all the features, and perform all the functions, of the electronic system to induce the occupants of a vehicle to fasten seat belts according to the present invention.

The invention claimed is:

1. An electronic system in a vehicle having a radio, for inducing to induce the occupants of the vehicle to fasten seat belts, said electronic system comprising the radio of the vehicle having a volume control, with the electronic system being configured to:
   determine an alert condition indicating that a seat belt has not been fastened or has not been properly fastened by at least one occupant of the vehicle;
   allow the vehicle radio to operate even when said alert condition is present; and for as long as said alert condition persists, control the volume of the vehicle radio so that it does not exceed predetermined low volume level regardless of attempts to set the volume control higher than said predetermined low volume level, with control of the volume to no more than the predetermined low volume level comprising a condition of at least one of:
   a) if the vehicle radio is on and the volume of the vehicle radio is higher than the low volume level, the control comprising lowering the volume of the vehicle radio to said low volume level;
   b) if the vehicle radio is on and the volume of the vehicle radio is lower than or equal to said low volume level, the control comprising limiting an increase of the volume of the vehicle radio by a user above said low volume level;
   c) if the vehicle radio is off, the control comprising setting the volume of the vehicle radio to the low volume level when the vehicle radio is turned on by the user;
   d) if the vehicle radio is on, the control comprising inhibiting any adjustment of the volume of the vehicle radio by the user; and
   e) if the vehicle radio is on, the control comprising allowing the user to lower the volume of the vehicle radio, and limiting an increase of the volume of the vehicle radio by the user above said low volume level.

2. The electronic system according to claim 1, further configured to: receive a presence signal (PRES) indicating the presence of an occupant on a seat of the vehicle; receive a fastening signal (FAST) indicating that the corresponding seat belt has been fastened; and determining said alert condition based on said presence and fastening signals (PRES, FAST).

3. The electronic system according to claim 2, further configured to: receive a speed signal (SPEED) indicating the speed of the vehicle; and determining said alert condition also based on said speed signal (SPEED).

4. The electronic control system according to claim 3, wherein the alert condition also indicates that the seat belt has not been fastened or has not been properly fastened by an occupant of the vehicle when the speed of the vehicle satisfies a given condition.

5. The electronic system according to claim 4, wherein said given condition is defined by the fact that the speed of the vehicle exceeds a minimum value.

6. The electronic system according to claim 1, further configured to: display a message inviting the occupants to fasten seat belts on a display for as long as said alert condition persists.

7. The electronic system according to claim 6, wherein the message inviting the occupants to fasten seat belts is displayed continuously.

8. The electronic system according to claim 6, wherein the message inviting the occupants to fasten seat belts is displayed each time a user performs an action aimed at adjusting the volume of the vehicle radio.

9. The electronic system according to claim 6, wherein the message inviting the occupants to fasten seat belts is displayed each time a user performs an action aimed at increasing the volume of the vehicle radio to above said low volume level.

10. The electronic system to induce the occupants of the vehicle to fasten seat belts according to claim 1, further being provided in combination with an on-board infotelematic system for the vehicle.

11. The electronic system to induce the occupants of the vehicle to fasten seat belts according to claim 1, further being provided in combination with the vehicle.

12. The electronic system to induce the occupants of the vehicle to fasten seat belts according to claim 1, further being provided in combination with a software program comprising software code portions stored on a tangible, non-transitory medium for being executed, when the software program is loaded in a memory of an electronic control and a processing unit of the vehicle and run on said electronic control and processing unit.

* * * * *